(12) United States Patent
Sagi et al.

(10) Patent No.: US 7,231,811 B2
(45) Date of Patent: Jun. 19, 2007

(54) ADAPTIVE LEAK TESTING METHOD

(76) Inventors: Nehemia Sagi, 1436 N. Claridge Way, Carmel, IN (US) 46032; Ronald Guosen Zhang, 5875 Dovetree Ct., Carmel, IN (US) 46033

(*) Notice: Subject to any disclaimer, the term of this patent is extended or adjusted under 35 U.S.C. 154(b) by 13 days.

(21) Appl. No.: 10/985,821

(22) Filed: Nov. 10, 2004

(65) Prior Publication Data

US 2005/0247110 A1    Nov. 10, 2005

Related U.S. Application Data

(60) Provisional application No. 60/568,990, filed on May 7, 2004.

(51) Int. Cl.
*G01M 3/26* (2006.01)
(52) U.S. Cl. ............................................ 73/40; 702/51
(58) Field of Classification Search .................. 702/51; 73/40
See application file for complete search history.

(56) References Cited

U.S. PATENT DOCUMENTS

| | | | | |
|---|---|---|---|---|
| 4,532,795 A | * | 8/1985 | Brayman et al. | 73/40 |
| 4,587,619 A | * | 5/1986 | Converse et al. | 702/51 |
| 4,942,758 A | * | 7/1990 | Cofield | 73/49.2 |
| 5,408,420 A | * | 4/1995 | Slocum et al. | 702/51 |
| 5,861,546 A | * | 1/1999 | Sagi et al. | 73/40.5 R |
| 6,561,009 B1 | * | 5/2003 | Perry et al. | 73/49.7 |
| 7,024,919 B2 | * | 4/2006 | Arima et al. | 73/40.5 R |

OTHER PUBLICATIONS

Cincinnati Test Systems, Inc. "Sentinel C-20 Update," Application Bulletin #122. <http://www.cincinnati-test.com/downloads/pdf/app_bulletin/ab122.pdf>.

* cited by examiner

*Primary Examiner*—Michael Cygan
(74) *Attorney, Agent, or Firm*—Baker & Daniels LLP (57) ABSTRACT

Apparatus for performing leak testing on products is disclosed. Specifically, the present invention includes a method, system, and apparatus for performing an adaptive leak test on products under test.

24 Claims, 6 Drawing Sheets

Table 1

| Variable | Description |
|---|---|
| Adaptive | Test Adaptive Leak Flow $L_{adaptive}$ |
| Measure | Test Measured Leak Flow $L_{measure}$ |
| Time | Time when the adaptive test determination is made |
| Leak Diff | $\dfrac{L_{measure} - L_{adaptive}}{V_2 - L_{measure}} \times 100\%$ <br> Where <br> $L_{measure}$: Measured Leak Flow if Full Test is performed <br> $L_{adaptive}$: Calculated Adaptive Flow in Adaptive Test <br> V2: Leak Tolerance |
| Full Test | Yes if full cycle test is performed. Blank if the test result is determined before the full test cycle |
| Std Dev | Standard Deviation of all Adaptive Test UUT LeakDiff. Results of the full test cycle samples are not included in calculation. <br><br> $\sqrt{\dfrac{n\sum x^2 - (\sum x)^2}{n(n-1)} + \left(\dfrac{\sum x}{n}\right)^2}$ <br> Where <br> X: LeakDiff in the table above <br> N: No. of samples with adaptive leak flow result |
| 6* Std Dev | Std Dev multiplied by 6 (user selectable) |
| Tolerance | 100% (user selectable) |
| Leak Detected | No. of successfully detected Leak UUTs by Adaptive Test |
| Leak Missed | No. of successfully detected Non-Leak UUTs by Adaptive Test |
| Non-Leak Detected | No. of Leak UUTs detected as Non-Leak by Adaptive Test |
| Leak Missed | No. of Non-Leak UUTs detected as Leak by Adaptive Test |
| Pass | Pass criteria for adaptive test analysis: <br>     1)     6* Std Dev < 100, <br>     2)     Leak Missed = 0 <br>     3)     Non-Leak Missed = 0 <br><br> If not "pass" it is could be recommended to change adaptive test parameters until test is "pass." |
| Average Test Time(s) | Average Test Time of all UUT results, including the full test samples |
| Full Test Time(s) | Total Test Time |
| No. of Full Test Time(s) | No. of UUTs under full test |

FIG. 5

ADAPTIVE LEAK TESTING METHOD

CROSS-REFERENCE TO RELATED APPLICATION

This application claims priority to U.S. Provisional Application Ser. No. 60/568,990, filed May 7, 2004, the disclosure of which is expressly incorporated herein by reference.

FIELD OF THE INVENTION

The present invention relates to product testing, and more specifically to adaptive methods for testing products for leaks.

BACKGROUND AND SUMMARY

Many products are produced in an air or liquid tight manner for environmental, health, freshness, operational and/or other reasons. To meet the need for seal-tight products, test equipment has been developed to test certain types of products for leaks using air tests utilizing micro-flow sensors. For example, U.S. Pat. No. 5,861,546 to Sagi et al., the disclosure of which is expressly incorporated herein by reference, discloses a leak detection apparatus that is suitable for detecting leaks in a product having an opening to which a leak sensor and a vacuum system may be coupled to form a closed test system.

Conventional leak testing systems and methods employ procedures wherein an individual leak test lasts a predetermined amount of time. Each product under test is subjected to the same test time period, regardless of whether the product has a gross leak which is apparent immediately, a marginal leak, an insignificant leak, or no leak at all. Consequently, a given number of products require a relatively fixed period of time for testing.

The present invention provides a method by which the period of time for testing a particular product for leaks is variable and dynamically changes depending upon leak characteristics of the product in the on-going test such as the leakage flowrate and the stability of the leakage flowrate. Thus, it is possible to test a larger number of products in a given period of time as compared to conventional techniques.

These and other features of the present methods and apparatuses will become apparent and be further understood upon reading the detailed description provided below with reference to the following drawings.

BRIEF DESCRIPTION OF THE DRAWINGS

FIG. 5 is a table illustrating descriptions of variables from the screen shot shown in FIG. 4.

DETAILED DESCRIPTION OF THE INVENTION

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

The present invention includes a method, system, and apparatus for performing adaptive leak testing on products. The system can be used with any type of leak testing system such as those described in U.S. Pat. No. 6,584,828 to Sagi et al., the disclosure of which is expressly incorporated herein by reference.

Additionally, embodiments of the present invention can be used by intelligent gas leak sensors (IGLS) such as those described in U.S. Pat. No. 5,861,546, the disclosure of which is expressly incorporated herein by reference.

As described above, conventional leak testing methods usually involve determining a reference pressure to apply to the product, a test time period during which the pressure will be applied to the product, and an acceptable leakage amount or limit to separate acceptable products from unacceptable or defective products. The test time period is usually fixed so that each product test takes the same amount of time. At the conclusion of the test time period, the leakage flowrate is measured and compared with the preselected acceptable leakage limit. If the actual leakage flowrate measured at the end of the test time period is greater than the acceptable leakage limit, the products fails and is classified as unacceptable. Conversely, if the actual leakage flowrate measured at the end of the test time period is less than the acceptable leakage limit, the product passes and is classified as acceptable.

The present invention involves utilizing an adaptive leak testing method which reduces the overall test time for testing a plurality of products by shortening the test period time for products that have a gross leak or an insignificant leak. In one embodiment, only the products that have a marginal leak, a leak that may make the product unacceptable, are tested for the full test time period. By shortening the test period time for products having a gross or obvious leak and products having only an insignificant leak or no leak, the overall time required to test a plurality of products is reduced.

The method of the present invention can be practiced as a computer software application that can be stored on computer readable media such as a hard-disk, CD-ROM, DVD, RAM, or a floppy disk. The software application can be installed on and the method practiced by a computer or a processor that is a component of an Intelligent Gas Leak Sensor (IGLS). The method can be used with any leak detection system configured to test products for leaks.

In one embodiment, a software application loaded on a computer is used to capture and store leak test results (signatures of leak flow vs. time), analyze those results, and develop a set of adaptive test coefficients that are downloaded to an IGLS sensor processor. Once downloaded, the computer is not required to run normal day-to-day leak testing. Once the IGLS sensor processor is programmed with the appropriate coefficients and mathematical formulas, the IGLS sensor processor performs the adaptive leak test. In alternative embodiments, the software application simulates the adaptive test using the methods and formulas described below to generate the adaptive test coefficients and design the test protocol.

Figure 1A:
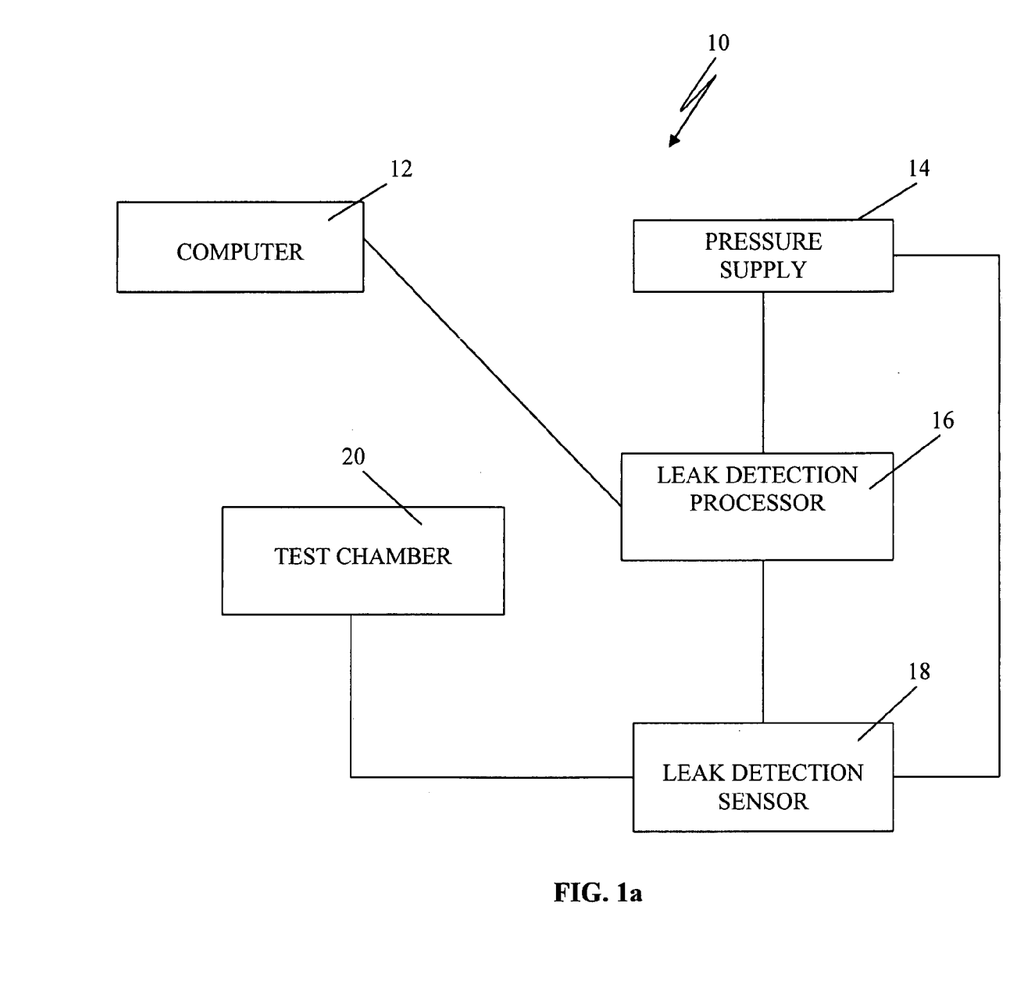
FIG. 1a is a block diagram of one embodiment of a leak testing system.

One embodiment of a leak detection system 10 including a computer 12, a pressure supply 14, a leak detection processor 16, a leak detection sensor 18, and a test chamber 20 is shown in FIG. 1a. Computer 12 may be any conventional computing device, and is coupled to leak detection processor 16. Leak detection processor 16 is coupled to pressure supply 14, performs measurement functions and controls the leak detection sensor 18. Leak detection sensor 18 is coupled between pressure supply 14 and test chamber 20 to detect gas flow to and from test chamber 20. Test chamber 20 is generally operable to receive a product such as a casting or a package containing a medical product and to subject the product to a controlled pressurized environment.

Figure 1B:
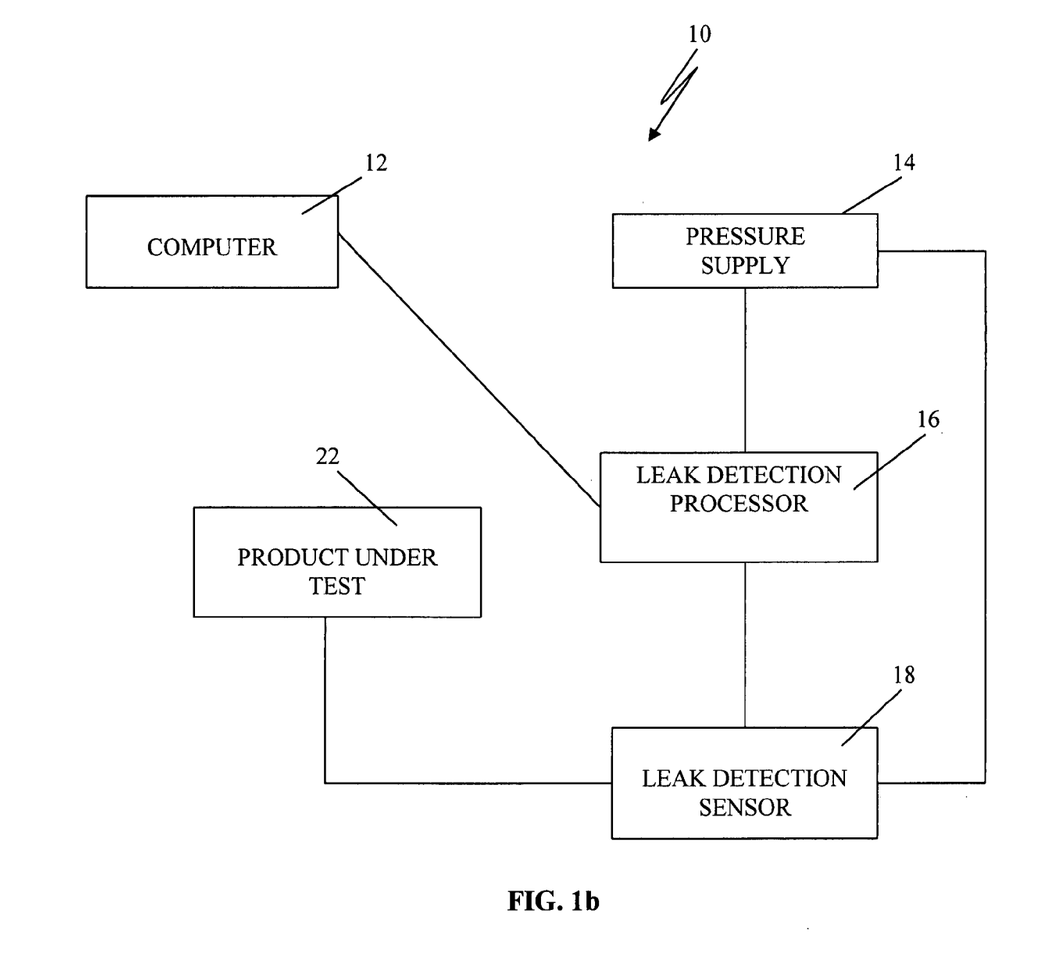
FIG. 1b is a block diagram of another embodiment of a leak testing system.

It should be understood that leak testing systems having other configurations could also use the method of the present invention. For example, in FIG. 1b the pressure source may be configured to couple directly to the product under test 22, as opposed to test chamber 20 shown in FIG. 1a. In such an example, pressure is applied to the interior of the product. Any of a plurality of combinations of these configurations are also suitable for use with the present invention.

In the embodiment of FIG. 1a, leak detection system 10 is operable to (1) obtain a measurement of the gas flow through the system 10 at a particular time while controlling a near constant pressure within the system 10 throughout a test period, (2) measure and calculate total mass, total volume, mass flow, and/or volumetric flow of the gas flow through the system 10 during the test period, and (3) determine whether a product being tested such as a sealed package has a leak failure based upon the calculated total mass, total volume, mass flow rate, or volumetric flow rate of the gas flow through the system 10 during the test period.

To perform a leak test on a product such as a medical device sealed in a plastic bag using the leak detection system 10, the product to be tested is placed in the test chamber 20. Leak detection processor 16 enables pressure source 14 to apply a reference pressure to test chamber 20. The reference pressure is applied to the product and maintained for the test time period. Usually, the reference pressure is less than atmospheric pressure although any suitable pressure could be selected. While the reference pressure is applied by pressure source 14, leak detection sensor 18 monitors any gas flow to or from the test chamber 20. Leak detection sensor 18 outputs a signal indicative of an actual leakage flowrate to leak detection processor 16 if any gas flow is detected while the reference pressure is being applied.

Leak detection processor 16 records the actual leakage flowrate of any gas to or from the product while the reference pressure is applied. Based on the actual measured leakage flowrate, the predetermined coefficients, and the formulas described below, leak detection processor 16 stops the test dynamically if the product has a gross leak or an insignificant leak and continues the test until the full test time period has elapsed for products having marginal leaks. Leak detection processor 16 outputs a pass or fail signal based on the measured actual leakage flowrate, the dynamically predicted flowrates, and the set of test parameters and coefficients stored inside the leak detection processor 16.

One method of the present invention can be implemented as a software application configured to be executed by computer 12. The software application stores and analyzes data uploaded to computer 12 by leak detection processor 16 for a plurality of different products and performs repetitive tests to calculate leak testing coefficients which are downloaded and used by leak detection processor 16 during the adaptive leak testing method described herein. In another embodiment, a software application evaluates data and simulates the leak testing procedure to determine the leak testing coefficients. In yet another embodiment, the software application allows a user to select a safety factor for the product leak test. The higher the safety factor selected, the longer the average test time for testing a plurality of products. The selected safety factor is downloaded to leak detection processor 16 and is used in the calculations of the leak testing method.

The software application and variations thereof described above calculates the leak testing coefficients based on the user inputs and one or a combination of stored data from previous runs, simulations, experiments, knowledge in the art, research, accepted guidelines, quality assurance studies, statistical methods, etc. Based on the leak testing coefficients and mathematical models such as those described below, leak detection processor 16 determines whether the product has a gross leak, an insignificant leak, or a marginal leak during each test period. If a product has a leakage flowrate below the acceptable flowrate, then the product is acceptable. If a product has a leakage flowrate above the acceptable flowrate, then the product is not acceptable.

Once the leak testing coefficients are downloaded to leak detection processor 16, leak detection system 10 can operate without computer 12 until a user chooses to update the coefficients, recalibrate the sensor, log data, perform system maintenance, or upload a different model optimized for a different product. Computer 12 can be disconnected from leak detection processor 16 for extended periods and reconnected when needed.

Mathematical models can be used to compute a predicted leakage flowrate of the product based on actual leakage flowrate and the rate of change of the actual leakage flowrate over time. The predicted leakage flowrate is compared to calculated upper and lower leakage flowrate values. If the predicted leakage flowrate is between the upper and lower leakage flowrate values, then the product has a marginal leak and the test continues to determine if the product has an acceptable or unacceptable leakage flowrate. If the predicted leakage flowrate is greater than the upper leakage flowrate value, then the product is classified as having a gross or obvious leak and is therefore unacceptable. If the predicted leakage flowrate is less than the lower leakage flowrate value, then the product is classified as having an insignificant leak and is therefore acceptable.

Figure 2:
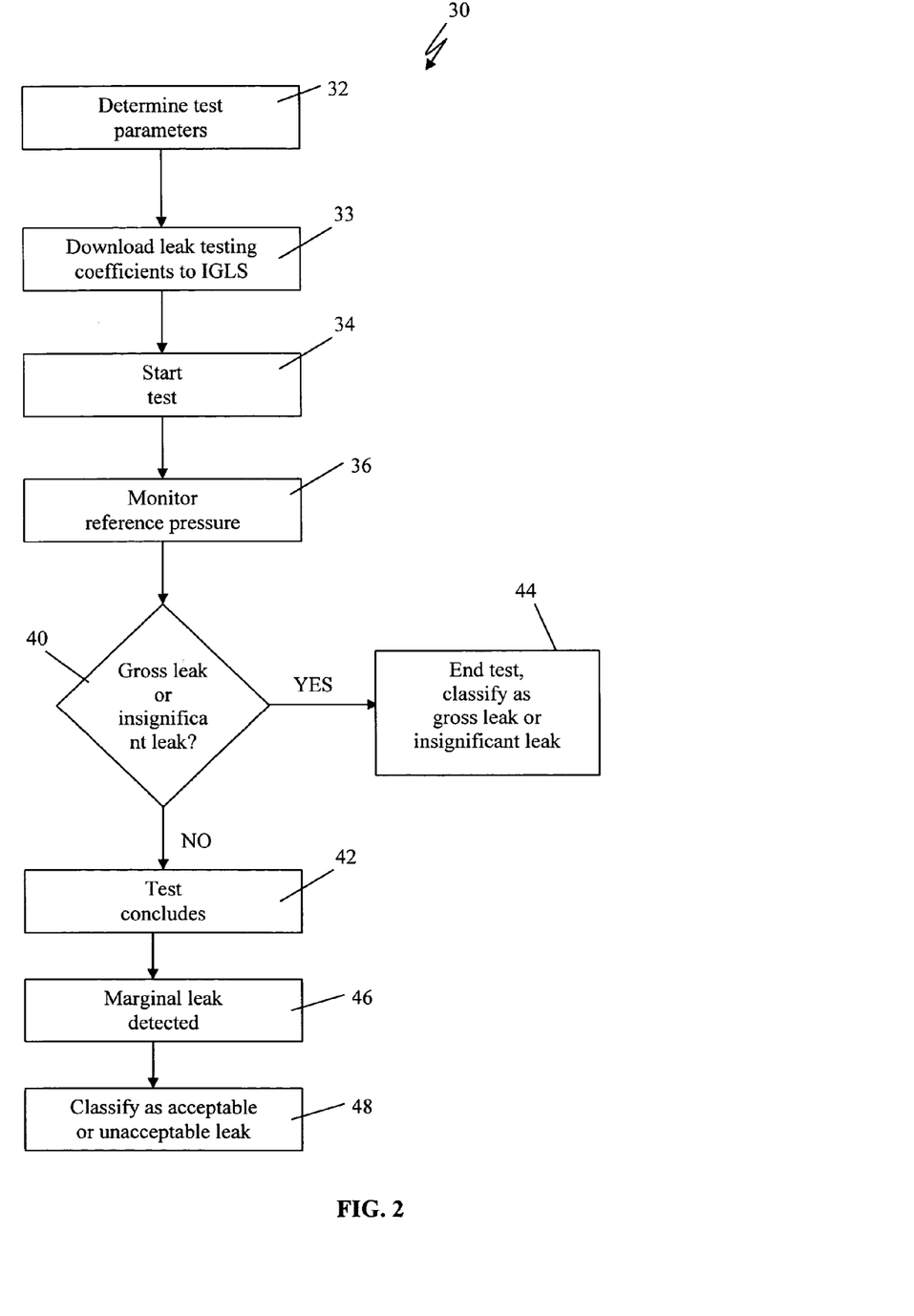
FIG. 2 is a flowchart of an adaptive leak testing method.

FIG. 2 is a flowchart 30 illustrating the steps for performing one method of the adaptive leak testing which can be used with leak detection system 10 described above or any other suitable leak detection system. As discussed above, the leak testing coefficients and the leak test parameters are calculated by a software application loaded on a computer in step 32. In step 33, the leak testing coefficients and other leak test parameters are downloaded to a leak sensor processor of an IGLS. As discussed above, the leak test parameters can be determined by a software application running on computer 12 using information input by the user such as safety factors, test time periods, acceptable leakage limits, etc.

In step 34, the test begins by applying the reference pressure to the product under test. In step 36, the leak detection sensor 18 monitors any gas flow to or from the test chamber 20 while the reference pressure is maintained. In step 40, the leak detection processor 16 calculates the predicted leakage flowrate based on the actual leakage flowrate and the rate of change of the actual leakage flowrate over time, which is the slope of a best line fit algorithm to a plot of actual leakage flowrate versus time. The predicted flowrate is then compared with upper and lower leakage flowrate values to determine if a gross leak, an insignificant leak, or a marginal leak is present. If a gross leak or an insignificant leak is detected at step 40, then the test ends and the product is classified accordingly as shown in step 44.

If a marginal leak is present or a determination cannot be made, then the test continues until the cumulative test time is equal to the total allowed test time selected by the user at which time the test concludes in step 42. At this point, the product is determined to have a marginal leak, as shown in step 46. In step 48, leak detection processor 16 compares the actual leakage flowrate at the end of the test time period with the acceptable leakage flowrate and classifies the product as acceptable or unacceptable.

Figure 3:
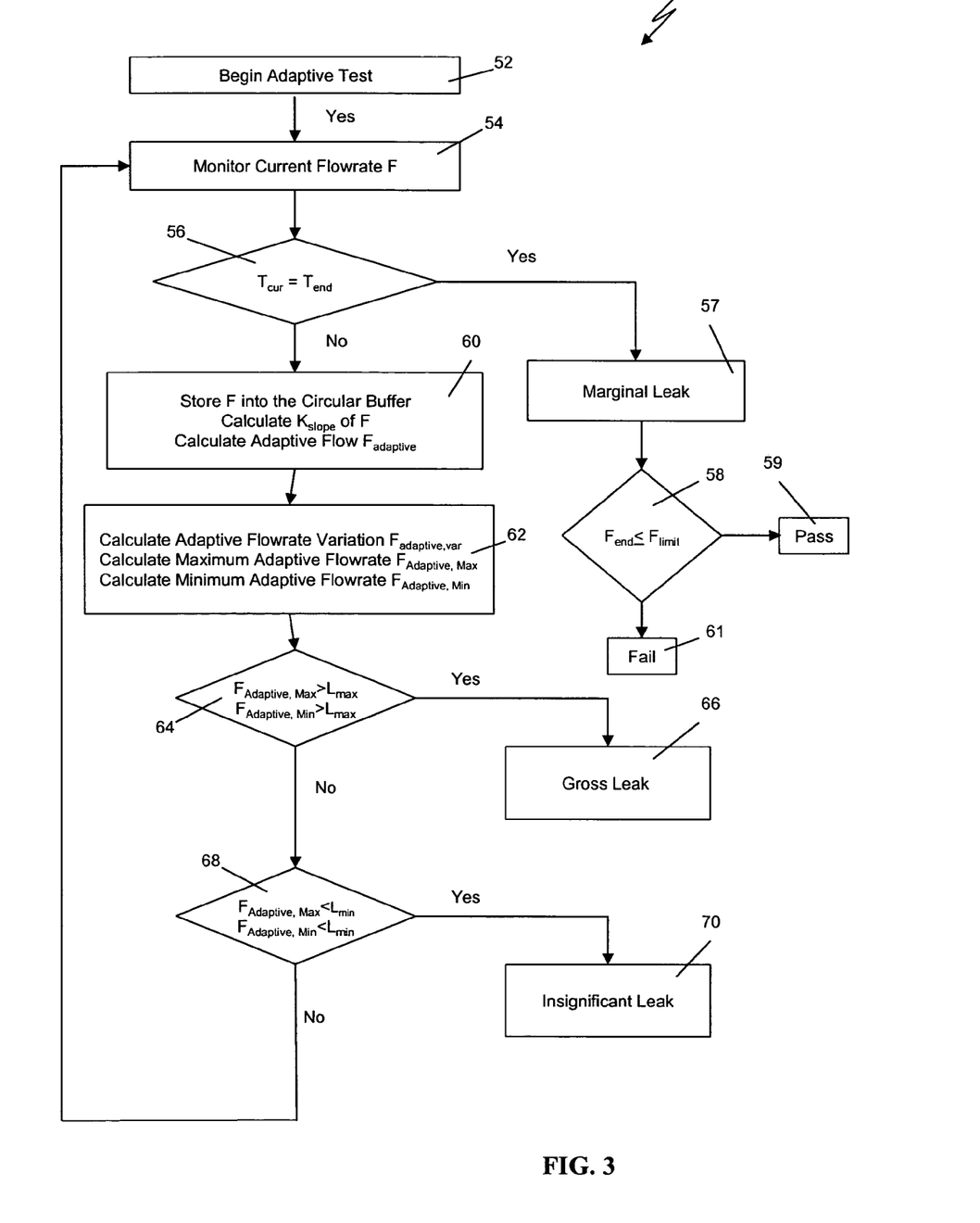
FIG. 3 is a flowchart of another embodiment of an adaptive leak testing method.

Another embodiment of a method of adaptive leak testing is shown in FIG. 3. FIG. 3 shows a flowchart 50 including steps for performing an adaptive leak testing method which can be used with leak detection system 10 or any other suitable leak detection system. Generally, the method disclosed by flowchart 50 is implemented in the form of computer software and is performed by an IGLS, although the software can by operated by a computer to analyze data and simulate tests. In step 52, the test time period, which has been specified by the user, of the leak test begins. In step 54, the current flowrate F between the pressure supply and the product chamber is monitored by leak detection sensor 18. In step 56, if the current test time ($T_{cur}$) is equal to the end of the test time period ($T_{end}$), which indicates the end of a test cycle, then the method advances to step 57. In step 57, a marginal leak has been detected and the test proceeds to step 58. In step 58, if the actual leakage flowrate $F_{end}$ at $T_{end}$ is less than or equal to the acceptable leakage flowrate, $F_{limit}$, then the method proceeds to step 59 and outputs a pass signal indicating the product is acceptable. If $F_{end}$ is greater than $F_{limit}$, then the method proceeds to step 61 which outputs a fail signal indicating that the product is unacceptable.

In step 56, if the adaptive test period has not concluded, (i.e., $T_{cur}$ is not equal to $T_{end}$), then the method proceeds to step 60. In step 60, the current flowrate F is stored in a first-in-first-out (FIFO) circular buffer which starts to fill up during the adaptive test period and $K_{slope}$ of F and adaptive flowrate $F_{adaptive}$ are calculated. The buffer time B (in secs) for the FIFO circular buffer determines how many sample flows will be recorded by the leak detection sensor and is calculated according to the following equation:

$$B = \frac{D_1}{100} \times (T_{end} - T_{start}) \quad (1)$$

where

B=Buffer time in seconds.
$D_1$=Buffer time %.
$T_{start}$=Total test time before the test phase starts.
$T_{end}$=Full test cycle time.

When a specified number of samples are present in the buffer, $K_{slope}$ and $F_{adaptive}$ are calculated. $K_{slope}$ is the slope of the actual readings recorded in the FIFO circular buffer. In this embodiment, $K_{slope}$ is calculated using a first order best line fit (minimum least square) method. In alternative embodiments, any other suitable method could be used to determine $K_{slope}$. $K_{slope}$ is calculated according to the following equation:

$$K_{slope} = \frac{n \times \Sigma(t_i \times F_i) - (\Sigma t_i) \times (\Sigma F_i)}{n \times \Sigma t_i^2 - (\Sigma t_i)^2} \quad (2)$$

where $K_{slope}$=Flowrate slope in units such as cc/(min*sec).
$t_i$=Timestamp of the measurement in sec.
$F_i$=Flowrate measurement of the leakage flowrate in units such as cc/min.
n=Buffer size for calculation.

$K_{slope}$ is then used to calculate the adaptive flowrate ($F_{adaptive}$) according to the following equation:

$$F_{Adaptive,i} = F_i + \alpha \times (T_{end} - T_{cur}) \times K_{slope,i} \quad (3)$$

where $F_{adaptive,i}$=Adaptive leak flowrate in units such as cc/min.
α=Alpha, signature decay factor (D5=0.1–1). 1.00 if the slope (trend) is constant, however, the trend usually becomes smaller and smaller when it gets close to the converged value. 0.8 to 1 is usually the default value.
$F_i$=Flowrate measurement in units such as cc/min.
$K_{slope,i}$=Flowrate slope in units such as cc/(min*sec).
$T_{end}$=Test end time in sec.
$T_{cur}$=Test current time in sec.

In step 62, the adaptive flowrate variation ($F_{adaptive, var}$), the maximum adaptive flowrate ($F_{Adaptive, Max}$), and the minimum adaptive flowrate ($F_{Adaptive, Min}$) are calculated. The adaptive flowrate variation ($F_{adaptive, var}$ is calculated according to the following equation:

$$F_{adaptive,var} = |F_{adaptive,largest} - F_{adaptive,smallest}| \quad (4)$$

where $F_{adaptive,var}$=Adaptive flowrate variation in the FIFO buffer.
$F_{adaptive,largest}$=Largest adaptive flowrate in the FIFO buffer.
$F_{adaptive,smallest}$=Smallest adaptive flowrate in the FIFO buffer.

The maximum adaptive flowrate ($F_{Adaptive, Max}$) is calculated according to the following equation:

$$F_{adaptive,Max} = F_{adaptive,last} + D_2 * F_{adaptive,var} * \frac{T_{end} - T_{cur}}{B} \quad (5)$$

where $F_{adaptive,Max}$=Maximum adaptive flow in the FIFO buffer.
$F_{adaptive,last}$=Last adaptive flow in the FIFO buffer.
$F_{adaptive,var}$=Adaptive flow variation in the FIFO buffer.
$T_{end}$=Test end time in sec.
$T_{cur}$=Test current time in sec.
B=Buffer time in sec.
$D_2$=Safety multiplier (user defined).

The minimum adaptive flowrate ($F_{Adaptive, Min}$) is calculated according to the following equation:

$$F_{adaptive,\text{Min}} = F_{adaptive,last} - D_2 * F_{adaptive,var} * \frac{T_{end} - T_{cur}}{B} \quad (6)$$

where
- $F_{adaptive,Min}$=Minimum adaptive flowrate in the FIFO buffer.
- $F_{adaptive,last}$=Last adaptive flowrate in the FIFO buffer.
- $F_{adaptive,var}$=Adaptive flowrate variation in the FIFO buffer.
- $T_{end}$=Test end time in sec.
- $T_{cur}$=Test current time in sec.
- B=Buffer time in sec.
- $D_2$=Safety multiplier (user defined).

Next, in step 64, $F_{Adaptive, Max}$ is compared to the upper limit of the leak rate window ($L_{max}$). $L_{max}$ is equal to a user specified safety multiplier (D3) multiplied by the user specified leak rate tolerance (V2) which is the acceptable leak rate. For example, $L_{max}$ could be set at 1.2 times the acceptable leak rate. Also in step 64, $F_{Adaptive, Min}$ is compared to the lower limit of the leak rate window $L_{min}$. $L_{min}$ is equal to a user specified safety multiplier (D4) multiplied by the user specified leak rate tolerance (V2) which is the acceptable leak rate. For example, $L_{min}$ could be 0.8 times the acceptable leak rate. If $F_{Adaptive, Max}$ is greater than $L_{max}$ and $F_{Adaptive, Min}$ is greater than $L_{max}$ a gross leak is present, as shown in step 66. The product is then classified as having a gross leak which is unacceptable. If either $F_{Adaptive, Max}$ or $F_{Adaptive, Min}$ are less than $L_{max}$, then the method continues to step 68.

At step 68, $F_{Adaptive, Max}$ and $F_{Adaptive, Min}$ are compared to $L_{min}$ to determine if an insignificant leak is present. If $F_{Adaptive, Max}$ and $F_{Adaptive, Min}$ are less than $L_{min}$, then an insignificant leak is present, as shown in step 70. In step 70, the product is classified having an insignificant leak and therefore acceptable. If either $F_{Adaptive, Max}$ or $F_{Adaptive, Min}$ are greater than $L_{min}$, then the method loops back to step 54 to start the process over. The process continues to loop until the adaptive test period ends, the gross leak is detected, or an insignificant leak is detected.

Figure 4:
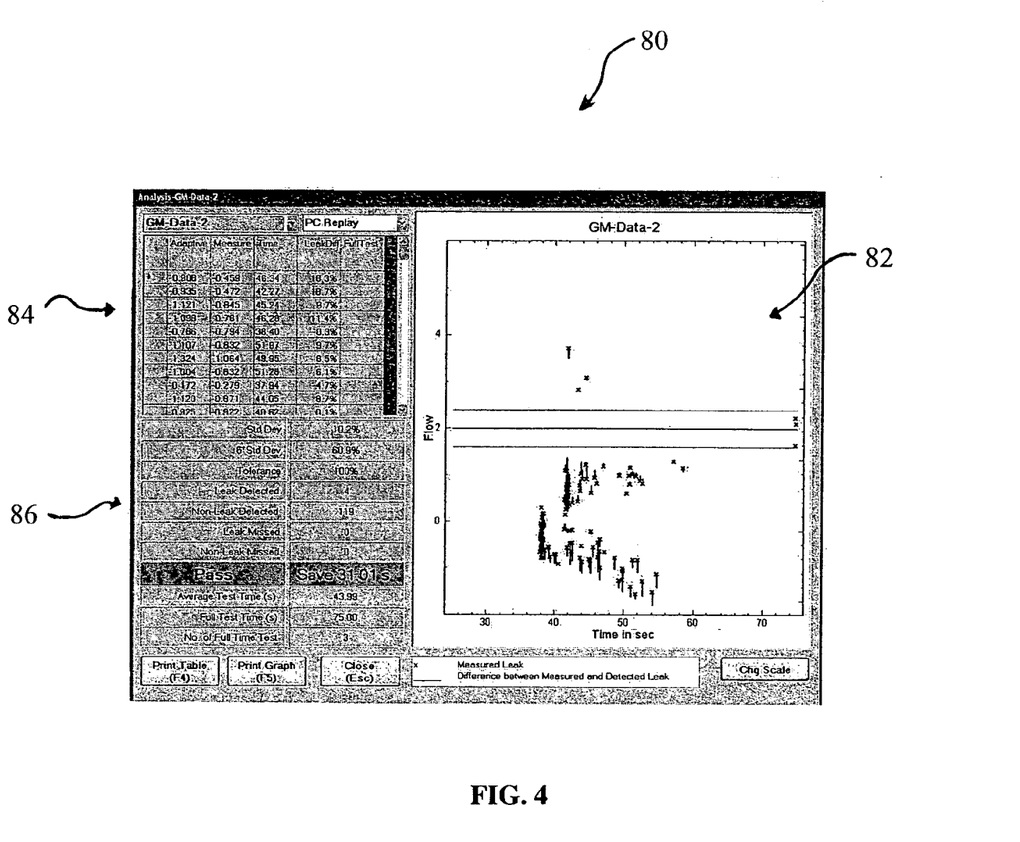
FIG. 4 is a screen shot of a software application that performs a method of the present invention.

Referring now to FIG. 4, a screen shot of a software application 80 that performs a method of analyzing data to determine leak testing parameters is shown. The software application 80 includes a graph display portion 82, a data display portion 84, and a calculation display portion 86. FIG. 5 (Table 1) includes descriptions of the variables in the screen shot shown in FIG. 4. Software application 80 can be used to analyze data captured by an IGLS and determine leak testing coefficients for a new product or update the leak testing coefficients used for a product that has already been tested.

As described in Table 1, the "Adaptive" column and the "Time" column in data display portion 84 are indicative of the calculated adaptive leakage flowrate ($L_{adaptive}$) at time t which is shown in the "Time" column. The "Measure" column illustrates the measured leakage flowrate ($L_{measure}$) which is the measured leakage flowrate at the end of the full test time period. In the embodiment shown in FIG. 4, the full test time is 75 seconds, although the user can specify any suitable test time period. In software application 80, the leak test is performed on the product under test for the full test time period to compare the actual measured leakage flowrate (Lmeasure) at the end of the test time period, tend, with the predicted leakage flowrate ($L_{adaptive}$). As shown in FIG. 5/Table 1, "Leak Diff" is equal to the percentage of the difference between ($L_{measure}$) and ($L_{adaptive}$ divided by the difference between the acceptable leakage flowrate ($V_2$) and $L_{measure}$.

The pass/fail criteria for this embodiment is determined by multiplying the standard deviation of the "LeakDiff" by six and comparing the resulting percentage to 100. If six times the standard deviation is less than 100, then a pass signal is generated. In alternative embodiments, the standard deviation multiplier is user selectable. As shown in the "Average Test Time (s)" cell of portion 86 of FIG. 4, the average test time for the adaptive test in this example is 43.99 seconds compared to the "Full Test Time (s)" of 75 seconds for a time savings of 31.01 seconds per test. As indicated by "Non-Leak Missed" cell, no leaks would have been undetected using the adaptive test method.

The adaptive leak testing method of the present invention can be implemented as computer software as discussed above or can be performed manually during a leak testing process. As discussed above, any suitable method for determining the parameters such as the lower and upper leakage flowrates of the adaptive leak testing method can be used.

While this invention has been described as having exemplary embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of testing a product for leaks, comprising the steps of:
   applying a reference pressure to one of an interior and an exterior of the product;
   developing a gas flow through a sensor in response to applying the reference pressure; and
   determining a dynamically predicted leakage flowrate based upon an actual measured leakage flowrate and a rate of change of the actual measured leakage flowrate over time.

2. The method of claim 1, further comprising the step of concluding the test if one of the gross leak and the insignificant leak is detected.

3. The method of claim 1, further comprising the step of calculating a test time period during which the reference pressure is applied.

4. The method of claim 3, wherein the test time period is shortened if one of the gross leak and the insignificant leak is detected.

5. The method of claim 1, further comprising the step of determining whether the product has one of a gross leak, a marginal leak, and an insignificant leak based on the dynamically predicted leakage flowrate, the actual measured leakage flowrate, and predetermined leak testing coefficients.

6. A method of testing a product for leaks, comprising the steps of:
   determining a first time period for testing the product for leaks
   applying a reference pressure to one of an interior and an exterior of the product for the first time period;
   developing a gas flow through a sensor in response to applying the reference pressure;

measuring the gas flow through the sensor to determine an actual leakage flowrate;

determining a dynamically predicted final gas flowrate based upon the actual leakage flowrate and a rate of change of the actual leakage flowrate over time; and determining whether the product has one of a gross leak, a marginal leak, and an insignificant leak based on the predicted final gas flowrate.

7. The method of claim 6, wherein the predicted final gas flowrate is calculated based upon a safety factor selected by a user.

8. The method of claim 7, wherein the safety factor is calculated using a statistical risk factor selected by a user.

9. The method of claim 6, wherein the first time period is shortened if one of the gross leak and insignificant leak is detected.

10. The method of claim 6, further comprising the step of determining whether the product has one of an acceptable leak and an unacceptable leak if the product has a marginal leak.

11. The method of claim 6, wherein the predicted final flowrate is based on a set of predetermined test parameters.

12. The method of claim 6, wherein the sensor is an intelligent gas leak sensor (IGLS).

13. A software application for testing a product for leaks, the software application stored on computer readable media, the software application configured to control a computer to perform the steps of:

determining a first leakage flowrate and a second leakage flowrate;

controlling a pressure source to apply a reference pressure to one of an interior and an exterior of the product for a dynamic test time period;

receiving a signal from a leak flow sensor in response to applying the reference pressure;

monitoring the sensor during the test time period to determine an actual leakage flowrate;

determining a dynamically predicted final leakage flowrate based on the actual leakage flowrate, a rate of change of the actual leakage flowrate over time, and predetermined test parameters; and ending the dynamic test time period if the predicted final leakage flowrate is one of less than the first leakage flowrate and greater than the second leakage flowrate.

14. The software application of claim 13, wherein the first leakage flowrate indicates an insignificant leak in the product.

15. The software application of claim 13, wherein the second leakage flowrate indicates a gross leak in the product.

16. The software application of claim 13, further comprising the steps of continuing the dynamic test time period if the actual leakage flowrate is greater than the first leakage flowrate and less than the second leakage flowrate and determining if the product has one of an unacceptable leak and an acceptable leak.

17. The software application of claim 13, wherein the sensor is an intelligent gas leak sensor.

18. The software application of claim 13, wherein the first and second leakage flow rates are calculated based upon a safety factor selected by a user.

19. An apparatus for testing a product for leaks, the apparatus including:

a pressure source configured to apply a reference pressure to one of an interior and an exterior of the product for a variable time period;

a flow sensor configured to measure the reference pressure and a gas flow, the sensor further configured to output a signal indicative of an actual leakage flowrate; and;

a sensor processor configured to control the pressure source, receive signals from the flow sensor, and determine based upon the signals, a rate of change of the signals over time, and predetermined test parameters whether the product has one of a gross leak, a marginal leak, and an insignificant leak, the predetermined test parameters including a user selectable safety factor.

20. The apparatus of claim 19, further comprising a computer configured to calculate the test parameters and monitor the sensor processor.

21. The apparatus of claim 19, wherein the flow sensor is an intelligent gas leak detection sensor.

22. The apparatus of claim 19, wherein the sensor processor is configured to shorten the variable time period if one of a insignificant leak and a gross leak is detected.

23. The apparatus of claim 22, wherein the sensor processor determines if the product has one of an unacceptable leak and an acceptable leak if a marginal leak is detected.

24. The apparatus of claim 19, wherein a computer records the signal indicative of the gas flow.

* * * * *